US010466758B2

(12) United States Patent
Bolan et al.

(10) Patent No.: US 10,466,758 B2
(45) Date of Patent: Nov. 5, 2019

(54) MANAGING POWER CONSUMPTION IN A COMPUTING SYSTEM

(71) Applicant: International Business Machines Corporation, Armonk, NY (US)

(72) Inventors: Joseph E. Bolan, Cary, NC (US); Douglas I. Evans, Cary, NC (US); James A. Heaney, Carrboro, NC (US)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 14/262,151

(22) Filed: Apr. 25, 2014

(65) Prior Publication Data
US 2015/0309554 A1    Oct. 29, 2015

(51) Int. Cl.
| G06F 1/32 | (2019.01) |
| G06F 1/3206 | (2019.01) |
| G06F 1/3234 | (2019.01) |
| G06F 1/26 | (2006.01) |

(52) U.S. Cl.
CPC ............ G06F 1/3206 (2013.01); G06F 1/263 (2013.01); G06F 1/3234 (2013.01)

(58) Field of Classification Search
CPC ...... G06F 1/324; G06F 1/3234; G06F 1/3296; G06F 1/3243; G06F 1/3203; G06F 1/3206

See application file for complete search history.

(56) References Cited

U.S. PATENT DOCUMENTS

| 6,625,736 B1 * | 9/2003 | Berthaud ................ G06F 1/263 713/300 |
| 7,254,016 B1 * | 8/2007 | Strickland ............. G06F 1/3203 361/679.31 |
| 7,325,050 B2 | 1/2008 | O'Connor et al. |
| 7,496,772 B1 * | 2/2009 | Nguyen ................ G06F 1/3203 713/300 |

(Continued)

FOREIGN PATENT DOCUMENTS

WO    WO 2012/175144 A1    12/2012

OTHER PUBLICATIONS

Bianchini, R., et al., "Power and Energy Management for Server Systems", *Computer*, vol. 37 No. 11, Nov. 2004, pp. 68-76, IEEE Computer Society, USA.

(Continued)

*Primary Examiner* — Thomas C Lee
*Assistant Examiner* — Gary Collins
(74) *Attorney, Agent, or Firm* — David M. Quinn

(57) ABSTRACT

Managing power consumption in a computing system that includes a plurality of integrated technology elements ('ITEs') that receive power from a plurality of common form factor power supplies, including: determining the maximum amount of power that can be delivered by each of the common form factor power supplies; determining whether the maximum amount of power that can be delivered by a first common form factor power supply is different than the maximum amount of power that can be delivered by a second common form factor power supply; and responsive to determining that the maximum amount of power that can be delivered by the first common form factor power supply is different than the maximum amount of power that can be delivered by the second common form factor power supply, throttling one or more of the ITEs.

15 Claims, 5 Drawing Sheets

(56) References Cited

U.S. PATENT DOCUMENTS

| | | | |
|---|---|---|---|
| 7,519,843 B1 * | 4/2009 | Buterbaugh | G06F 1/30 713/322 |
| 7,992,011 B2 | 8/2011 | Yasuda et al. | |
| 8,028,183 B2 | 9/2011 | Bieswanger et al. | |
| 8,200,995 B2 | 6/2012 | Shiga et al. | |
| 2008/0249666 A1 * | 10/2008 | Buterbaugh | G06F 1/28 700/293 |
| 2008/0320322 A1 * | 12/2008 | Green | G06F 1/26 713/340 |
| 2009/0265564 A1 * | 10/2009 | Clemo | G06F 1/26 713/300 |
| 2010/0019576 A1 * | 1/2010 | Buterbaugh | H02J 1/10 307/53 |
| 2010/0102790 A1 * | 4/2010 | Buterbaugh | H02M 3/1584 323/283 |
| 2010/0211810 A1 | 8/2010 | Zacho | |
| 2012/0017104 A1 | 1/2012 | Siba et al. | |
| 2012/0054512 A1 | 3/2012 | Archibald et al. | |
| 2013/0013759 A1 * | 1/2013 | Austen | G06F 15/161 709/223 |
| 2013/0013942 A1 * | 1/2013 | Koshimizu | G06F 1/3206 713/320 |
| 2013/0031390 A1 | 1/2013 | Smith, III et al. | |
| 2013/0145185 A1 | 6/2013 | Brumley et al. | |
| 2013/0339776 A1 * | 12/2013 | Jagadishprasad | G06F 9/5094 713/340 |
| 2015/0082055 A1 * | 3/2015 | Grout | G06F 1/26 713/300 |

OTHER PUBLICATIONS

Ranganathan, P., et al., "Ensemble-level Power Management for Dense Blade Servers", 33rd International Symposium on Computer Architecture (ISCA'06), Jun. 2006, pp. 66-77, IEEE Computer Society, USA.

\* cited by examiner

MANAGING POWER CONSUMPTION IN A COMPUTING SYSTEM

BACKGROUND OF THE INVENTION

Field of the Invention

The field of the invention is data processing, or, more specifically, methods, apparatuses, and products for managing power consumption in a computing system.

Description of Related Art

Modern computing systems can include a plurality of different computing devices, such as servers, that are powered by common form factor power supplies. Such common form factor power supplies may have a common mechanical enclosure. Each common form factor power supply, however, may be rated to deliver different wattage levels. As a consequence of common form factor power supplies being rated to deliver different wattage levels, the loads place on the power supplies may be unbalanced. Such an imbalance can lead to thermal faults in one or more power supplies, which could lead to an unexpected and complete loss of power to the computing devices that are supported by such power supplies, an inability to support desired power redundancy mode, long term reliability issues, or other problems.

SUMMARY OF THE INVENTION

Methods, apparatuses, and products for managing power consumption in a computing system, the computing system including a plurality of integrated technology elements ('ITEs') that receive power from a plurality of common form factor power supplies, including: detecting, by a system management module, that a new common form factor power supply has been installed in the computing system; determining, by the system management module, the maximum amount of power that can be delivered by each of the common form factor power supplies; determining, by the system management module, whether the maximum amount of power that can be delivered by a first common form factor power supply is different than the maximum amount of power that can be delivered by a second common form factor power supply; and responsive to determining that the maximum amount of power that can be delivered by the first common form factor power supply is different than the maximum amount of power that can be delivered by the second common form factor power supply, throttling, by the system management module, one or more of the ITEs in dependence upon the maximum amount of power that can be delivered by each of the common form factor power supplies.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
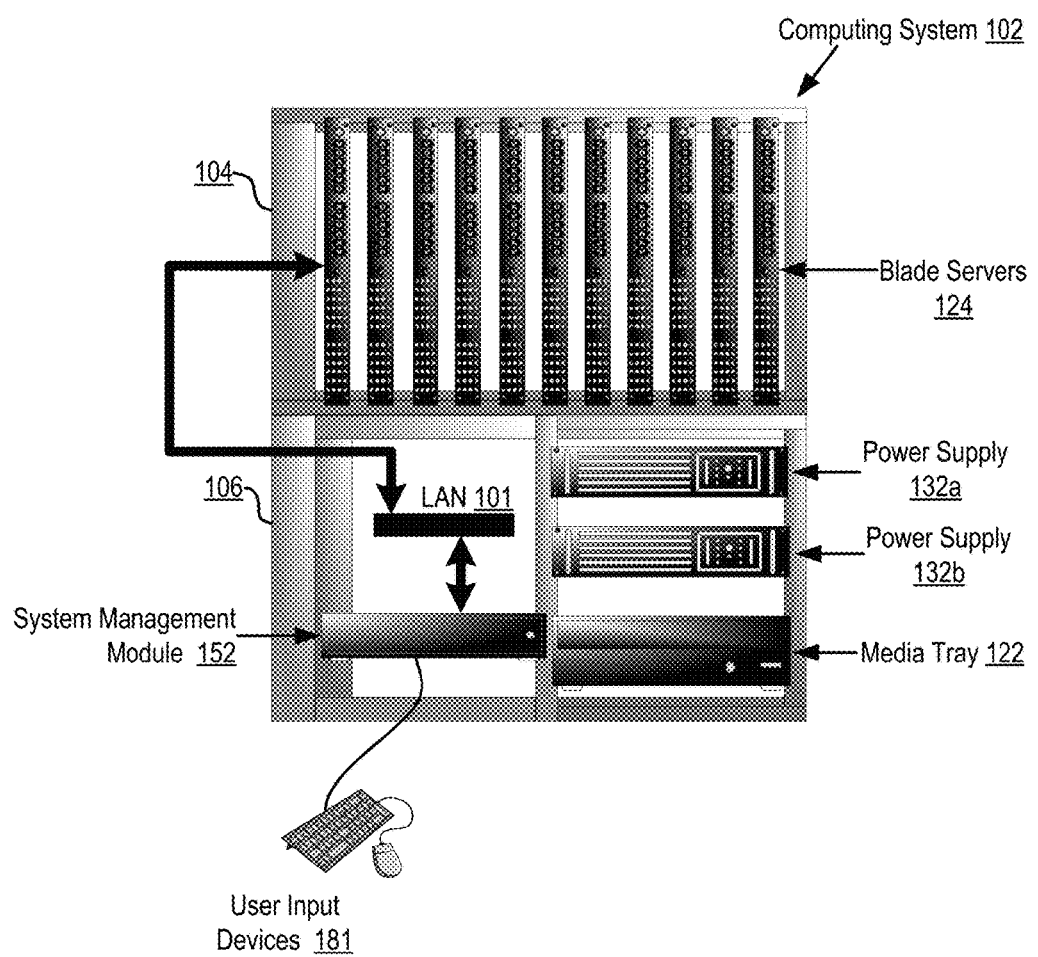
FIG. 1 sets forth a diagram of an example computing system in which power consumption may be managed according to embodiments of the present invention.

Example methods, apparatuses, and products for managing power consumption in a computing system in accordance with the present invention are described with reference to the accompanying drawings, beginning with FIG. 1. FIG. 1 sets forth a diagram of an example computing system (102) in which power consumption may be managed according to embodiments of the present invention. The computing system (102) of FIG. 1 includes a plurality of integrated technology elements ('ITEs') that received power from a plurality of common form factor power supplies (132a, 132b). Each ITE represents a computing component such as a storage device, a blower, a blade server (124), or other power consuming computing component of the computing system (102).

The ITEs depicted in FIG. 1 receive power from a plurality of common form factor power supplies (132a, 132b). Each common form factor power supply (132a, 132b) in FIG. 1 is a device that supplies electric power to an electrical load. Each common form factor power supply (132a, 132b) may be embodied, for example, as a switched mode power supply that transfers power from a source such as mains power to a load such as the ITEs, while converting voltage and current characteristics.

Each of the common form factor power supplies (132a, 132b) are designated as 'common form factor' power supplies because the power supplies are designed to have identical physical specifications, including identical dimensions, connector types, connector locations, and so on. The common form factor power supplies (132a, 132b) share a common form factor such that the common form factor power supplies (132a, 132b) can be mounted within uniform housings within the computing system (102). Readers will appreciate that while the physical form factor of each common form factor power supply (132a, 132b) are identical, the internal components within each common form factor power supply (132a, 132b) may vary such that each common form factor power supply (132a, 132b) may be capable of delivering different amounts of power to the ITEs.

The computing system (102) of FIG. 1 is depicted as a chassis environment. A 'chassis environment,' as the term is used in this specification, refers generally to a blade server system. The blade server system in the example depicted in FIG. 1 is installed in a two-bay chassis (104, 106) and includes one or more of blade servers (124), one or more system management modules (152), one or more media trays (122), and one or more common form factor power supplies (132a, 132b). The computing system (102) of FIG. 1 therefore includes a plurality of ITEs, illustrated in this example as blade servers (124), the system management module (152), and the media tray (122), although readers will appreciate that in other embodiments additional ITEs may be included in the computing system (102), where each additional ITE can be embodied as any power consuming computing component of the chassis environment.

The system management module (152) of FIG. 1 may be embodied as a computer, including software and hardware components, one or more computer processors and computer memory, that provides system management functions for components in the example chassis environment, including the blade servers (124) and the media tray (122). The system management module (152) of FIG. 1 may also make available connections for user input devices such as mice or keyboards (181) that are not generally connected directly to the blade servers (124) or to the chassis itself.

The computing system (102) of FIG. 1 also includes one or more blade servers (124). The one or more blade servers (124) of FIG. 1 are installed in cabinet bay (104) of the example computing system (102). Such blade servers (124) are computing devices implemented in blade form factor. The blade servers (124) may share access to the media tray (122) and may be connected to one another and to the system management module (152) for data communications through a local area network ('LAN') (101), which may be embodied as a small network installed within the computing system (102).

The computing system (102) of FIG. 1 also includes one or more media trays (122). The one or more media trays (122) in FIG. 1 may house non-volatile memory media generally. A media tray (122) may typically include Compact Disc read-only media drives ('CD-ROM'), Digital Video Disc ROM drives (DVD-ROM), CD-RW drives, DVD-RW drives, floppy disk drives, and so on as will occur those of skill in the art.

The arrangement of the chassis environment, network (101), and other devices making up the example computing system (102) illustrated in FIG. 1 are for explanation, not for limitation. Computing systems useful according to various embodiments of the present invention may include additional servers, routers, and other devices, not shown in FIG. 1, as will occur to those of skill in the art. Networks in such data processing systems may support many data communications protocols, including Transmission Control Protocol ('TCP'), Internet Protocol ('IP'), HyperText Transfer Protocol ('HTTP'), Wireless Access Protocol ('WAP'), Handheld Device Transport Protocol ('HDTP'), and others as will occur to those of skill in the art. Various embodiments of the present invention may be implemented on a variety of hardware platforms in addition to those illustrated in FIG. 1.

Figure 2:
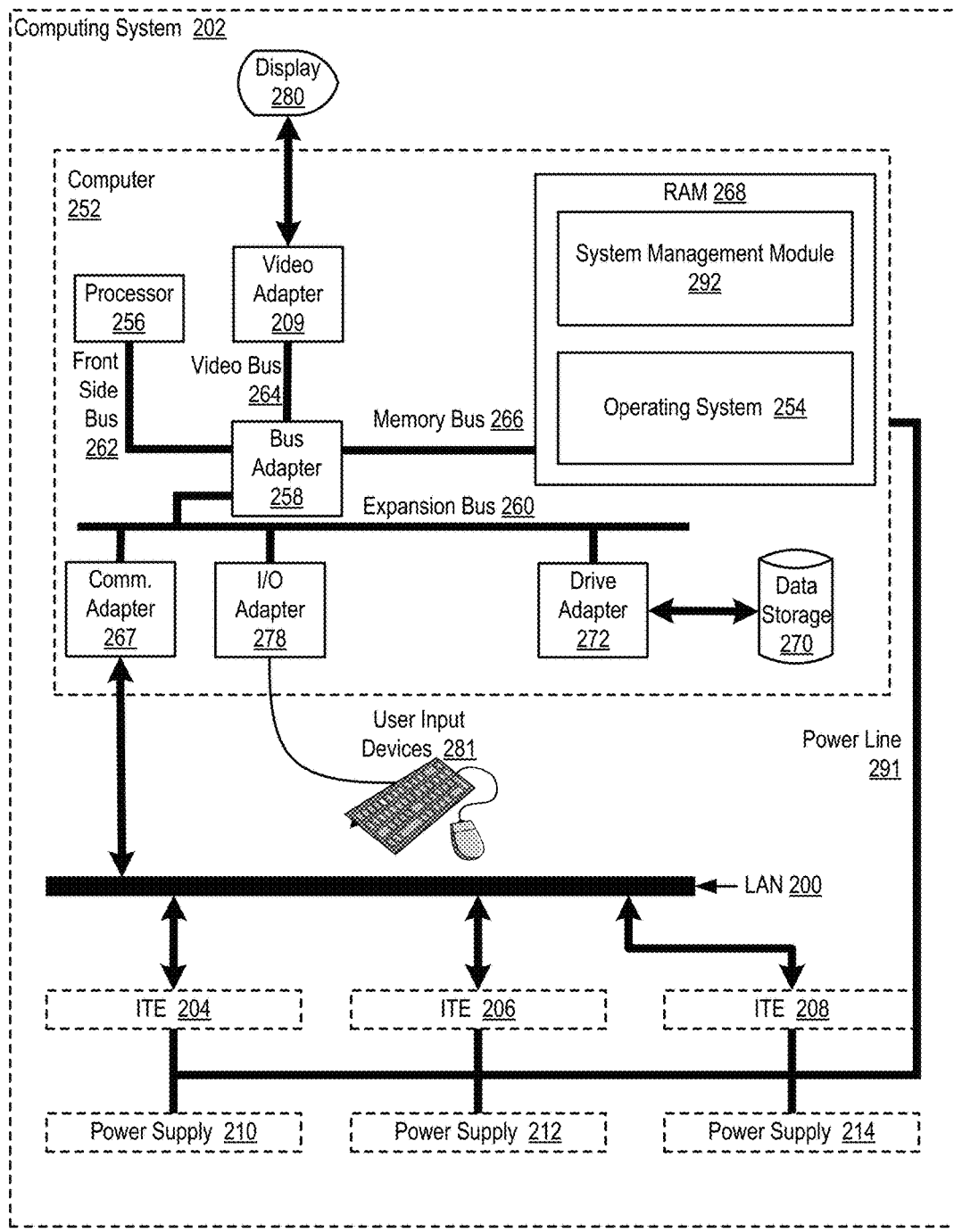
FIG. 2 sets forth a block diagram of automated computing machinery comprising an example computer useful in managing power consumption in a computing system according to embodiments of the present invention.

For further explanation, FIG. 2 sets forth a block diagram of automated computing machinery comprising an example computer (252) useful in managing power consumption in a computing system (202) that includes a plurality of ITEs (204, 206, 208) according to embodiments of the present invention. The computing system (202) of FIG. 2 may be embodied, for example, as a blade server system that includes a plurality of ITEs and a plurality of common form factor power supplies (210, 212, 214). In such an example, each ITE (204, 206, 208) may be embodied, for example, as a blade server, a blower, a network switch, a storage device, or any other power consuming component mounted within the computing system (202).

The computer (252) of FIG. 2 includes at least one computer processor (256) or 'CPU' as well as random access memory ('RAM') (268) which is connected through a high speed memory bus (266) and bus adapter (258) to processor (256) and to other components of the computer (252). Stored in RAM (268) is a system management module (292), a module of computer program instructions for managing power consumption in a computing system (202) that includes a plurality of ITEs (204, 206, 208) according to embodiments of the present invention.

The system management module (292) may be configured to manage power consumption in a computing system (202) by detecting that a new common form factor power supply has been installed in the computing system (202). Detecting that a new common form factor power supply has been installed in the computing system (202) may be carried out, for example, through the use of a presence detection line that sends a signal to the system management module (292) when one of the common form factor power supplies are removed and also sends a signal to the system management module (292) when a common form factor power supply is added to the computing system (202). In such an example, the new common form factor power supply may be installed in the computing system (202) after a previously installed common form factor power supply has been removed from the computing system (202) as part of the process of replacing a common form factor power supply. In such an example, the installation of a new common form factor power supply may change the power delivery capabilities of the set of installed common form factor power supplies.

The system management module (292) may be further configured to manage power consumption in a computing system (202) by determining the maximum amount of power that can be delivered by each of the common form factor power supplies (210, 212, 214). Determining the maximum amount of power that can be delivered by each of the common form factor power supplies (210, 212, 214) may be carried out, for example, by the system management module (292) retrieving vital product data ('VPD') from each of the common form factor power supplies (210, 212, 214). Such VPD may include, for example, a power rating that represents the maximum amount of power that can be delivered by a particular common form factor power supply (210, 212, 214), a manufacturer's part number for a particular common form factor power supplies (210, 212, 214) that may be used to look up the power rating of the common form factor power supply (210, 212, 214), and so on.

The system management module (292) may be further configured to manage power consumption in a computing system (202) by determining whether the maximum amount of power that can be delivered by a first common form factor power supply (210, 212, 214) is different than the maximum amount of power that can be delivered by a second common form factor power supply (210, 212, 214). Determining whether the maximum amount of power that can be delivered by two or more of the common form factor power supplies (210, 212, 214) is different may be carried out, for example, by the system management module (292) comparing the maximum amount of power that can be delivered by each common form factor power supply (210, 212, 214) to the maximum amount of power that can be delivered by all other common form factor power supplies (210, 212, 214) in the computing system (202).

The system management module (292) may be further configured to manage power consumption in a computing system (202) by throttling one or more of the ITEs (204, 206, 208) in dependence upon the maximum amount of power that can be delivered by two or more of the common form factor power supplies (210, 212, 214). Throttling one or more of the ITEs (204, 206, 208) in dependence upon the maximum amount of power that can be delivered by two or more of the common form factor power supplies (210, 212, 214) may be carried out, for example, by the system management module (292) sending an instruction to the one or more of the ITEs (204, 206, 208) to adjust various configuration parameters, such that the ITEs (204, 206, 208) may receive a sufficient amount of power from the common form factor power supplies (210, 212, 214). As such, one or more of the ITEs (204, 206, 208) may be throttled down so as to limit the cumulative power demand of the ITEs (204, 206, 208). In such an example, throttling the one or more of the ITEs (204, 206, 208) may be carried out, for example, by reducing the clock speed of computer processors within one or more of the ITEs (204, 206, 208), by placing one or more of the ITEs (204, 206, 208) in a reduced power mode such as a standby mode, and so on.

Also stored in RAM (268) of the computer (252) is an operating system (254). Operating systems useful for managing power consumption in a computing system (202) that includes a plurality of ITEs (204, 206, 208) according to embodiments of the present invention include UNIX™, Linux™, Microsoft XP™, AIX™, IBM's i5/OS™, and others as will occur to those of skill in the art. The operating system (254) and the system management module (292) in the example of FIG. 2 are shown in RAM (268), but many components of such software typically are stored in non-volatile memory also, such as, for example, on a disk drive (270).

The computer (252) of FIG. 2 includes disk drive adapter (272) coupled through expansion bus (260) and bus adapter (258) to processor (256) and other components of the computer (252). Disk drive adapter (272) connects non-volatile data storage to the computer (252) in the form of disk drive (270). Disk drive adapters useful in computers for managing power consumption in a computing system (202) that includes a plurality of ITEs (204, 206, 208) according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art. The example computer (252) of FIG. 2 includes one or more input/output ('I/O') adapters (278). I/O adapters implement user-oriented input/output through, for example, software drivers and computer hardware for controlling output to display devices such as computer display screens, as well as user input from user input devices (281) such as keyboards and mice. The example computer (252) of FIG. 2 includes a video adapter (209), which is an example of an I/O adapter specially designed for graphic output to a display device (280) such as a display screen or computer monitor. Video adapter (209) is connected to processor (256) through a high speed video bus (264), bus adapter (258), and the front side bus (262), which is also a high speed bus.

The example computer (252) of FIG. 2 includes a communications adapter (267) for data communications with other computers such as the ITEs (204, 206, 208) and for data communications with a data communications network (200). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for managing power consumption in a computing system (202) that includes a plurality of ITEs (204, 206, 208) according to embodiments of the present invention include modems for wired dial-up communications, Ethernet (IEEE 802.3) adapters for wired data communications network communications, and 802.11 adapters for wireless data communications network communications.

Figure 3:
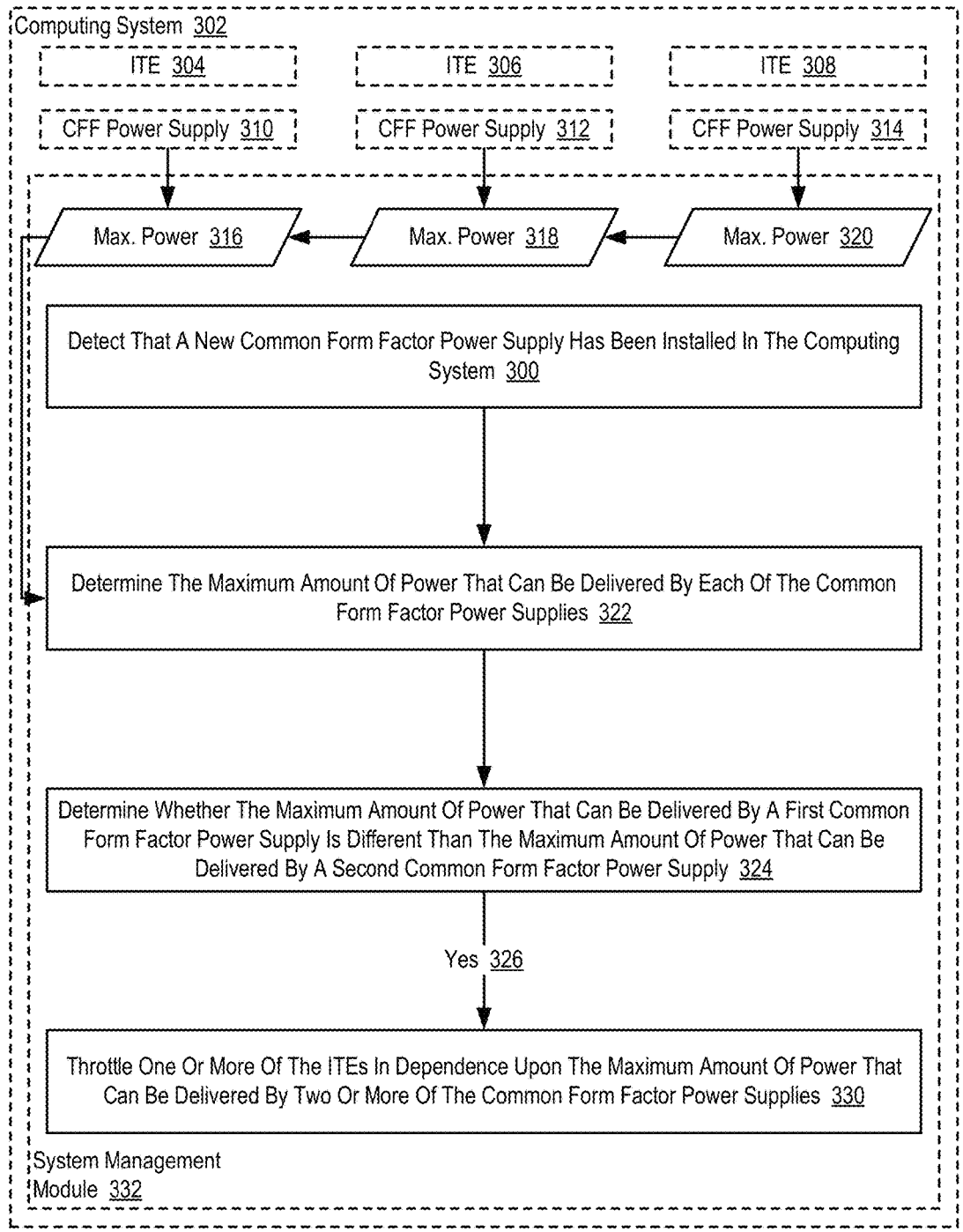
FIG. 3 sets forth a flow chart illustrating an example method for managing power consumption in a computing system according to embodiments of the present invention.

For further explanation, FIG. 3 sets forth a flow chart illustrating an example method for managing power consumption in a computing system (302) according to embodiments of the present invention. The computing system (302) depicted in FIG. 3 includes a plurality of ITEs (304, 306, 308). Each ITE (304, 306, 308) may be embodied, for example, as a blade server, a blower, a network switch, a storage device, or any other power consuming component of the computing system (302).

The ITEs (304, 306, 308) depicted in FIG. 3 receive power from a plurality of common form factor power supplies (310, 312, 314). Each common form factor power supply (310, 312, 314) in FIG. 3 is a device that supplies electric power to an electrical load. Each common form factor power supply (310, 312, 314) may be embodied, for example, as a switched mode power supply that transfers power from a source such as mains power to a load such as the ITEs (304, 306, 308), while converting voltage and current characteristics. Each of the common form factor power supplies (310, 312, 314) are designated as 'common form factor' power supplies (310, 312, 314) because the power supplies are designed to have identical physical specifications, including identical dimensions, connector types, connector locations, and so on. The common form factor power supplies (310, 312, 314) share a common form factor such that the common form factor power supplies (310, 312, 314) can be mounted within uniform housings within the computing system (302). Readers will appreciate that while the physical form factor of each common form factor power supply (310, 312, 314) are identical, the internal components within each common form factor power supply (310, 312, 314) may vary such that each common form factor power supply (310, 312, 314) may be capable of delivering different amounts of power to the ITEs (304, 306, 308).

The example method depicted in FIG. 3 is carried out, at least in part, by a system management module (332). The system management module (332) may be embodied, for example, as a module of computer program instructions executing on computer hardware such as a computer processor. The system management module (332) may be included as part of a standalone computer, including software and hardware components, one or more computer processors, and computer memory, that provides system management functions for all components in the example computing system (302). Such a computer may also make available connections for user input devices such as mice or keyboards that are not generally connected directly to the ITEs (310, 312, 314).

The example method depicted in FIG. 3 includes detecting (300), by the system management module (332), that a new common form factor power supply has been installed in the computing system (302). The system management module (332) may detect (300) that a new common form factor power supply has been installed in the computing system (302), for example, through the use of a presence detection line that sends a signal to the system management module (332) when one of the common form factor power supplies are removed and also sends a signal to the system management module (332) when a common form factor power supply is added to the computing system (302). In such an example, the new common form factor power supply may be installed in the computing system (302) after a previously installed common form factor power supply has been removed from the computing system (302) as part of the process of replacing one of the common form factor power supplies (310, 312, 314). In such an example, the installation of a new common form factor power supply may change the power delivery capabilities of the set of installed common form factor power supplies (310, 312, 314).

The example method depicted in FIG. 3 also includes determining (322), by the system management module (332), the maximum amount of power (316, 318, 320) that can be delivered by each of the common form factor power supplies (310, 312, 314). Determining (322) the maximum amount of power (316, 318, 320) that can be delivered by each of the common form factor power supplies (310, 312, 314) may be carried out, for example, by the system management module (332) retrieving VPD from each of the common form factor power supplies (310, 312, 314). Such VPD may include a power rating that represents the maximum amount of power (316, 318, 320) that can be delivered by a particular common form factor power supply (310, 312, 314), a manufacturer's part number for a particular common form factor power supplies (310, 312, 314) that may be used to look up the power rating of the common form factor power supply (310, 312, 314), and so on.

The example method depicted in FIG. 3 also includes determining (324), by the system management module (332), whether the maximum amount of power (316, 318, 320) that can be delivered by a first common form factor power supply (310, 312, 314) is different than the maximum amount of power (316, 318, 320) that can be delivered by a second common form factor power supply (310, 312, 314). Determining (324) whether the maximum amount of power (316, 318, 320) that can be delivered by a first common form factor power supply (310, 312, 314) is different than the maximum amount of power (316, 318, 320) that can be delivered by a second common form factor power supply (310, 312, 314) may be carried out, for example, by the system management module (332) comparing the maximum amount of power (316, 318, 320) that can be delivered by each common form factor power supply (310, 312, 314) to the maximum amount of power (316, 318, 320) that can be delivered by all other common form factor power supplies (310, 312, 314) in the computing system (302).

Consider an example in which the common form factor power supplies (310, 312, 314) in the computing system (302) are able to deliver a maximum amount of power to the ITEs (304, 306, 308) as indicated in Table 1, which is included below.

TABLE 1

Maximum Power Delivery Table

| Power Supply Identifier | Maximum Power |
|---|---|
| 310 | 2100 Watts |
| 312 | 2500 Watts |
| 314 | 2500 Watts |

In the example depicted in Table 1, one common form factor power supply (310) included in FIG. 3 is capable of delivering 2100 Watts of power to one or more of the ITEs (304, 306, 308), while the other two common form factor power supplies (312, 314) included in FIG. 3 are capable of delivering 2500 Watts of power to one or more of the ITEs (304, 306, 308). In such an example, the maximum amount of power (316, 318, 320) that can be delivered by two or more of the common form factor power supplies (310, 312, 314) may be affirmatively (326) determined (324) to be different.

The example method depicted in FIG. 3 also includes throttling (330), by the system management module (332), one or more of the ITEs (304, 306, 308) in dependence upon the maximum amount of power (316, 318, 320) that can be delivered by each of the common form factor power supplies (310, 312, 314). Throttling (33) the one or more ITEs (304, 306, 308) in FIG. 3 is carried out in response to affirmatively (326) determining that the maximum amount of power (316, 318, 320) that can be delivered by a first common form factor power supply (310, 312, 314) is different than the maximum amount of power (316, 318, 320) that can be delivered by a second common form factor power supply (310, 312, 314). For example, Table 1 included above indicates that the maximum amount of power (316) that can be delivered by a first common form factor power supply (310) is different than the maximum amount of power (318) that can be delivered by a second common form factor power supply (312).

Throttling (330) one or more of the ITEs (304, 306, 308) in dependence upon the maximum amount of power (316, 318, 320) that can be delivered by each of the common form factor power supplies (310, 312, 314) may be carried out, for example, by the system management module (332) sending an instruction to the one or more of the ITEs (304, 306, 308) instructing the ITEs (304, 306, 308) to adjust various configuration parameters, such that the cumulative amount of power demanded by the ITEs (304, 306, 308) can be serviced by the common form factor power supplies (310, 312, 314).

Consider an example in which each of the common form factor power supplies (310, 312, 314) were originally rated to deliver 2500 Watts of power each, where power supplies (310, 312) actively deliver power to a load and power supply (314) is a failover power supply. Assume in such an example that each ITE (304, 306, 308) is configured such that each ITE (304, 306, 308) may consume 1666 Watts of power when operating at full capacity, such that the total amount of power that may be consumed by the three ITEs (304, 306, 308) is 4998 Watts. In such an example, the active common form factor power supplies (310, 312) may be capable of delivering up to 5000 Watts, such that the common form factor power supplies (310, 312) could satisfy the 4998 Watt demand of the ITEs (304, 306, 308).

Assume in such an example, however, that one of the common form factor power supplies was swapped out and replaced by a common form factor power supply rated to deliver only 2100 Watts of power, as described above with reference to Table 1. In such an example, the total amount of power that may be delivered by the active common form factor ITEs (310, 312) is now 4600 Watts, such that the new set of common form factor power supplies (310, 312) cannot satisfy the 4998 Watt demand of the ITEs (304, 306, 308). As such, one or more of the ITEs (304, 306, 308) may be throttled (330) down so as to limit the cumulative power demand of the three ITEs (304, 306, 308) to a total of no more than 4600 Watts. Throttling (330) the one or more of the ITEs (304, 306, 308) may be carried out, for example, by reducing the clock speed of computer processors within one or more of the ITEs (304, 306, 308), by placing one or more of the ITEs (304, 306, 308) in a reduced power mode such as a standby mode, and so on.

Figure 4:
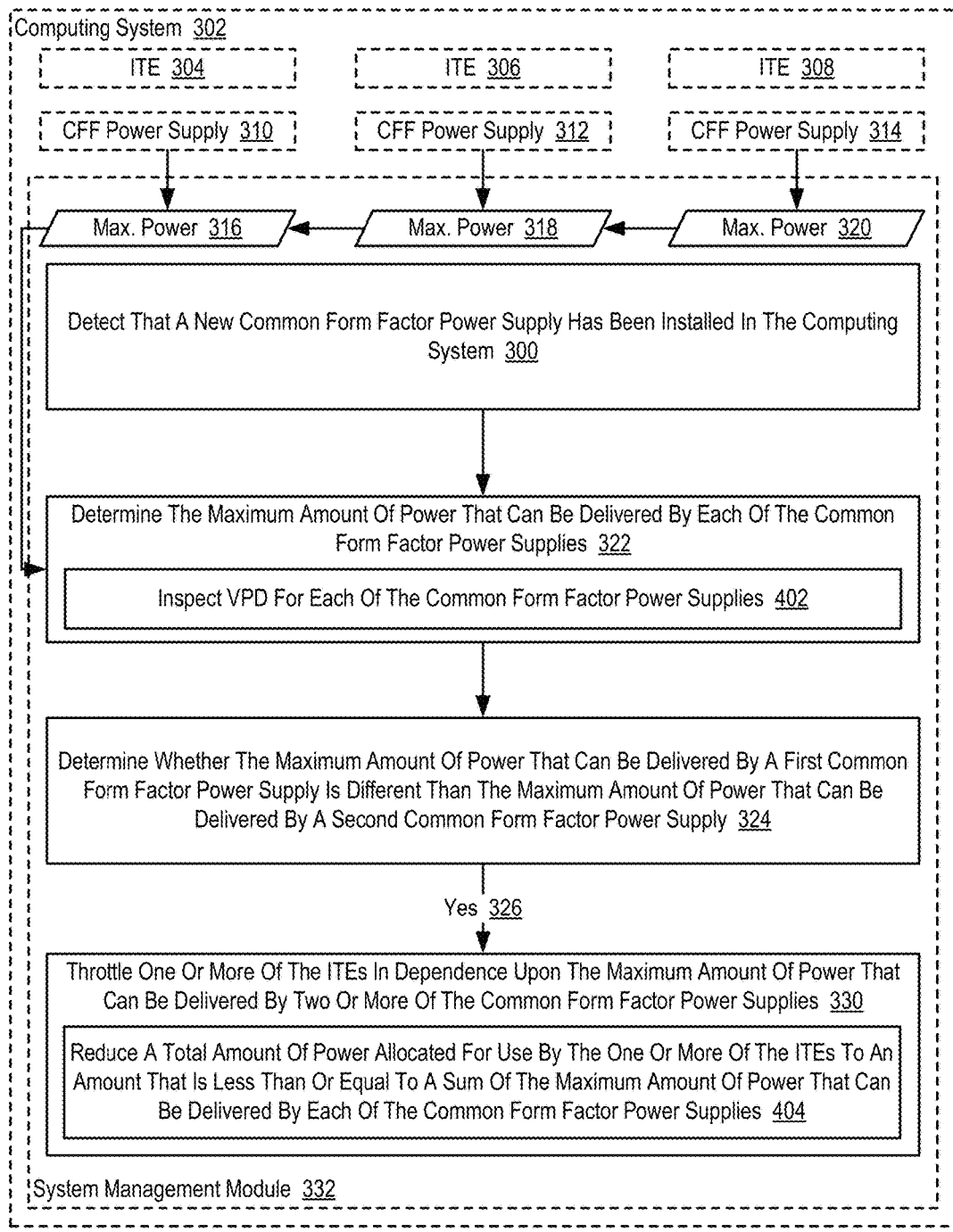
FIG. 4 sets forth a flow chart illustrating an additional example method for managing power consumption in a computing system according to embodiments of the present invention.

For further explanation, FIG. 4 sets forth a flow chart illustrating a further example method for managing power consumption in a computing system (302) according to embodiments of the present invention. The example method depicted in FIG. 4 is similar to the example method depicted in FIG. 3, as the example method depicted in FIG. 4 also includes detecting (300) that a new common form factor power supply has been installed in the computing system (302), determining (322) the maximum amount of power (316, 318, 320) that can be delivered by each of the common form factor power supplies (310, 312, 314), determining (324) whether the maximum amount of power (316, 318, 320) that can be delivered by a first common form factor power supply (310, 312, 314) is different than the maximum amount of power (316, 318, 320) that can be delivered by a second common form factor power supply (310, 312, 314), and throttling (330) one or more of the ITEs (304, 306, 308) in dependence upon the maximum amount of power (316, 318, 320) that can be delivered by each of the common form factor power supplies (310, 312, 314).

In the example method depicted in FIG. 4, determining (322) the maximum amount of power (316, 318, 320) that can be delivered by each of the common form factor power supplies (310, 312, 314) can include inspecting (402), by the system management module (332), VPD for each of the common form factor power supplies (310, 312, 314). The VPD for each of the common form factor power supplies (310, 312, 314) may be embodied a collection of configuration and informational data associated with each of the common form factor power supplies (310, 312, 314). The VPD for each of the common form factor power supplies (310, 312, 314) can include, for example, part numbers, serial numbers, or other information that may be used to look up the power rating of the common form factor power supply (310, 312, 314). Alternatively, the VPD for each of the common form factor power supplies (310, 312, 314) may include a power rating that represents the maximum amount of power that can be delivered by a particular common form factor power supply (310, 312, 314). The system management module (332) may inspect (402) VPD for each of the common form factor power supplies (310, 312, 314), for example, by querying each of the common form factor power supplies (310, 312, 314) via an I2C bus or other out-of-band bus.

In the example method depicted in FIG. 4, throttling (330) one or more of the ITEs (304, 306, 308) in dependence upon the maximum amount of power (316, 318, 320) that can be delivered by each of the common form factor power supplies (310, 312, 314) can include reducing (404) a total amount of power allocated for use by the one or more of the ITEs (304, 306, 308) to an amount that is less than or equal to a sum of the maximum amount of power (316, 318, 320) that can be delivered by each of the common form factor power supplies (310, 312, 314). The total amount of power allocated for use by the one or more of the ITEs (304, 306, 308) can represent the sum of the amount of power that each is allocated for use by each ITE (304, 306, 308). In such an example, each ITE (304, 306, 308) may therefore be configured so as to not require more than the amount of power that each is allocated its use, even when the ITE (304, 306, 308) is operating at full capacity.

Consider the example described above in which the maximum amount of power (316) that may be delivered by a first common form factor power supply (310) is initially 2500 Watts, the maximum amount of power (318) that may be delivered by a second common form factor power supply (312) is 2500 Watts, and a third common form factor power supply (312) is designated as a failover power supply that will not deliver any power to the ITEs (304, 306, 308) unless one of the other common form factor power supplies (310, 312) fails. In such an example, the total amount of power that may be delivered to the ITEs (304, 306, 308) is 5000 Watts, such that each of the depicted ITEs (304, 306, 308) can consume approximately 1666 Watts without overloading the common form factor power supplies (310, 312, 314).

In this example, however, assume that the first common form factor power supply (310) is replaced by a new common form factor power supply that can only deliver 2100 Watts of power to the ITEs (304, 306, 308), such that the new total amount of power that may be delivered to the ITEs (304, 306, 308) is 4600 Watts. The total amount of power allocated for use by the one or more of the ITEs (304, 306, 308) should therefore be reduced (404) to 4600 Watts or less. For example, the amount of power allocated for use by each of the depicted ITEs (304, 306, 308) may be reduced to 1533 Watts in order to avoid overloading the new set of common form factor power supplies (310, 312, 314).

In the example method depicted in FIG. 4, reducing (404) a total amount of power allocated for use by the one or more of the ITEs (304, 306, 308) may be carried out by determining how much power is currently allocated for use by the one or more of the ITEs (304, 306, 308) and reducing the amount of power allocated for use by one or more of the ITEs (304, 306, 308) such that the total amount of power allocated for use by the one or more of the ITEs (304, 306, 308) is less than or equal to a sum of the maximum amount of power (316, 318, 320) that can be delivered by each of the common form factor power supplies (310, 312, 314). The amount of power allocated for use by each ITE (304, 306, 308) may be reduced, for example, according to a predetermined reduction policy. Such a predetermined reduction policy may require that the amount of power allocated for use by each ITE (304, 306, 308) is reduced by an equal percentage, the amount of power allocated for use by each the most power consuming ITEs (304, 306, 308) is reduced more significantly, the amount of power allocated for use by power consuming ITEs (304, 306, 308) associated with a lower priority value are reduced before reducing the amount of power allocated for use by power consuming ITEs (304, 306, 308) associated with a higher priority value, and so on.

Figure 5:
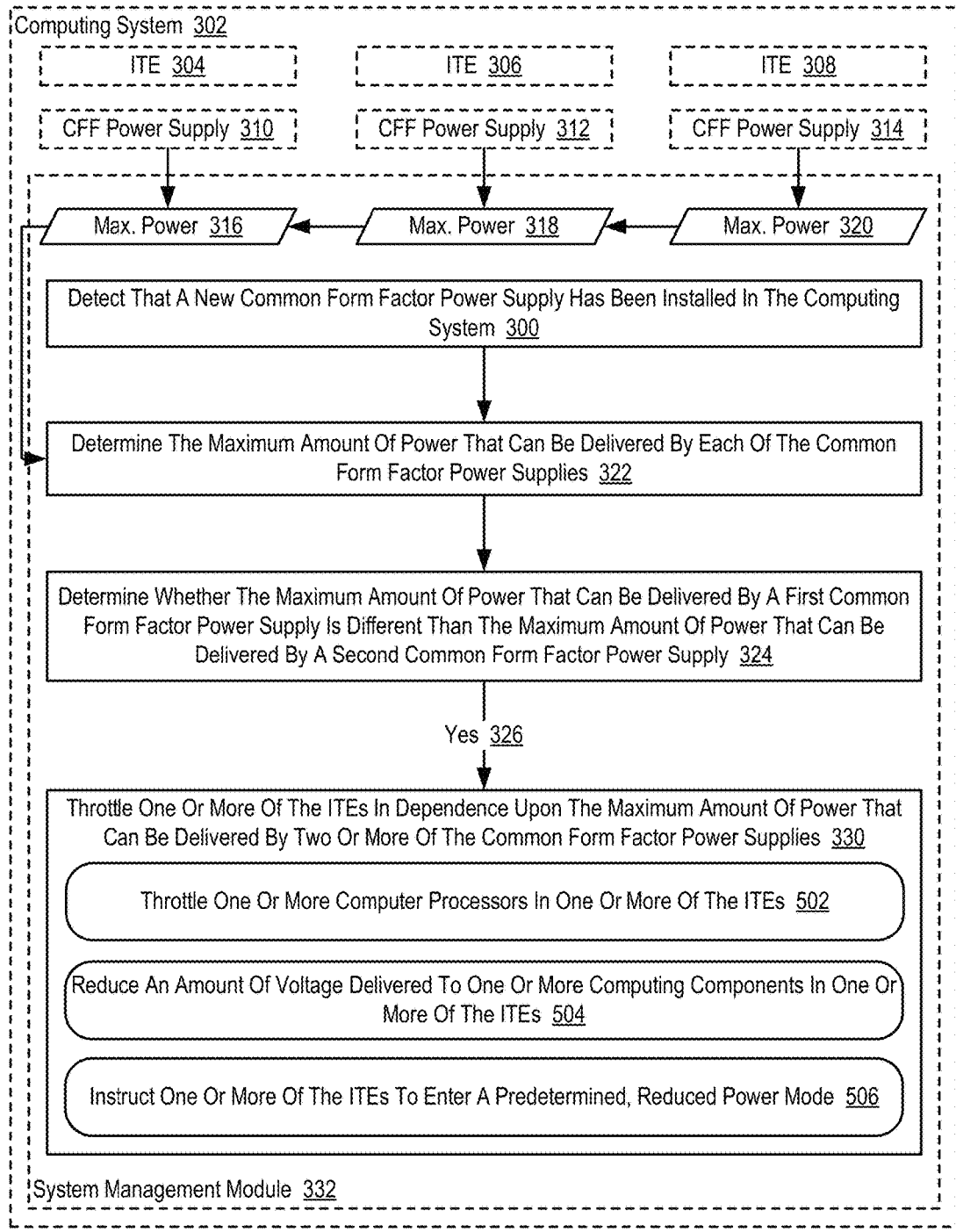
FIG. 5 sets forth a flow chart illustrating an additional example method for managing power consumption in a computing system according to embodiments of the present invention.

For further explanation, FIG. 5 sets forth a flow chart illustrating a further example method for managing power consumption in a computing system (302) according to embodiments of the present invention. The example method depicted in FIG. 5 is similar to the example method depicted in FIG. 3, as the example method depicted in FIG. 5 also includes detecting (300) that a new common form factor power supply has been installed in the computing system (302), determining (322) the maximum amount of power (316, 318, 320) that can be delivered by each of the common form factor power supplies (310, 312, 314), determining (324) whether the maximum amount of power (316, 318, 320) that can be delivered by a first common form factor power supply (310, 312, 314) is different than the maximum amount of power (316, 318, 320) that can be delivered by a second common form factor power supply (310, 312, 314), and throttling (330) one or more of the ITEs (304, 306, 308) in dependence upon the maximum amount of power (316, 318, 320) that can be delivered by each of the common form factor power supplies (310, 312, 314).

In the example method depicted in FIG. 5, throttling (330) one or more of the ITEs (304, 306, 308) in dependence upon the maximum amount of power (316, 318, 320) that can be delivered by each of the common form factor power supplies (310, 312, 314) can include throttling (502), by the system management module (332), one or more computer processors in one or more of the ITEs (304, 306, 308). Throttling (502) one or more computer processors in one or more of the ITEs (304, 306, 308) is a technique whereby the frequency of one or more computer processors can be dynamically adjusted during normal operations of the one or more computer processors. In the example method depicted in FIG. 5, the system management module (332) may throttle (502) one or more computer processors in one or more of the ITEs (304, 306, 308), for example, by sending an instruction to the one or more computer processors in one or more of the ITEs (304, 306, 308) to alter the P-state of the processor.

In the example method depicted in FIG. 5, throttling (330) one or more of the ITEs (304, 306, 308) in dependence upon the maximum amount of power (316, 318, 320) that can be delivered by each of the common form factor power supplies (310, 312, 314) can alternatively include reducing (504), by the system management module (332), an amount of voltage delivered to one or more computing components in one or more of the ITEs (304, 306, 308). Reducing (504) an amount of voltage delivered to one or more computing components in one or more of the ITEs (304, 306, 308) may be carried out, for example, by the system management module (332) reducing the amount of voltage supplied to one or more computer processors in one or more of the ITEs (304, 306, 308) by changing the C-state of the processor, the system management module (332) reducing the amount of voltage supplied to RAM in one or more of the ITEs (304, 306, 308), and so on. In such an example, the system management module (332) may reduce (504) the amount of voltage delivered to one or more computing components in one or more of the ITEs (304, 306, 308) through the use of voltage control mechanisms contained in system BIOS of the ITEs (304, 306, 308) or through other dynamic voltage scaling mechanisms.

In the example method depicted in FIG. 5, throttling (330) one or more of the ITEs (304, 306, 308) in dependence upon the maximum amount of power (316, 318, 320) that can be delivered by each of the common form factor power supplies (310, 312, 314) can alternatively include instructing (506), by the system management module (332), one or more of the ITEs (310, 312, 314) to enter a predetermined, reduced power mode. The predetermined, reduced power mode may be embodied, for example, as a standby mode, a hibernation mode, a sleep mode, or other operating mode in which an ITE (310, 312, 314) is operating at less than full capacity. In the example method depicted in FIG. 5, the system management module (332) may instruct (506) one or more of the ITEs (310, 312, 314) to enter a predetermined, reduced power mode through the use of system BIOS mechanisms to alter the power consumption mode of the ITEs (310, 312, 314), through the use of OS mechanisms to alter the power consumption mode of the ITEs (310, 312, 314), or through the use of other mechanisms for switching the power mode of the ITEs (310, 312, 314).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of managing power consumption in a computing system, the computing system including a plurality of integrated technology elements ('ITEs') that receive power from a plurality of active and fail over common form factor power supplies, the method comprising:
    detecting, by a system management module, that a previously installed common form factor power supply has been replaced by a new common factor form factor power supply installed in the computing system; and
    responsive to detecting, by a system management module, that a new common form factor power supply has been installed in the computing system:
        determining, by the system management module, a maximum amount of power that can be delivered by each of the common form factor power supplies;
        determining, by the system management module, that a maximum amount of power that can be delivered by the new common form factor power supply is less than a maximum amount of power that was delivered by the previously installed common form factor power supply; and
    responsive to determining that the maximum amount of power that can be delivered by the new common form factor power supply is less than the maximum amount of power that was delivered by the previously installed common form factor power supply:
        throttling, by the system management module, one or more of the ITEs that receive power from the plurality of active common form factor power supplies in dependence upon the maximum amount of power that can be delivered by each of the active common form factor power supplies and in dependence upon the configuration of the each of the active and failover common form factor power supplies including reducing a total amount of power allocated for use by the one or more of the ITEs that receive power from the plurality of active common form factor power supplies to an amount that is less than or equal to a sum of the maximum amount of power that can be delivered by each of the active common form factor power supplies.

2. The method of claim 1 wherein determining the maximum amount of power that can be delivered by each of the common form factor power supplies further comprises inspecting, by the system management module, vital product data ('VPD') for each of the common form factor power supplies.

3. The method of claim 1 wherein throttling one or more of the ITEs in dependence upon the maximum amount of power that can be delivered by each of the common form factor power supplies further comprises throttling, by the system management module, one or more computer processors in one or more of the ITEs.

4. The method of claim 1 wherein throttling one or more of the ITEs in dependence upon the maximum amount of power that can be delivered by each of the common form factor power supplies further comprises reducing, by the system management module, an amount of voltage delivered to one or more computing components in one or more of the ITEs.

5. The method of claim 1 wherein throttling one or more of the ITEs in dependence upon the maximum amount of power that can be delivered by each of the common form factor power supplies further comprises instructing, by the system management module, one or more of the ITEs to enter a predetermined reduced power mode.

6. An apparatus for managing power consumption in a computing system, the computing system including a plurality of integrated technology elements ('ITEs') that receive power from a plurality of common form factor power supplies, the apparatus comprising a computer processor, a computer memory operatively coupled to the computer processor, the computer memory having disposed within it computer program instructions that, when executed by the computer processor, cause the apparatus to carry out the steps of:
    detecting, by a system management module, that a previously installed common form factor power supply has been replaced by a new common factor form factor power supply installed in the computing system; and responsive to detecting, by a system management module, that a new common form factor power supply has been installed in the computing system:

determining, by the system management module, a maximum amount of power that can be delivered by each of the common form factor power supplies;

determining, by the system management module, that a maximum amount of power that can be delivered by the new common form factor power supply is less than a maximum amount of power that was delivered by the previously installed common form factor power supply; and responsive to determining that the maximum amount of power that can be delivered by the new common form factor power supply is less than the maximum amount of power that was delivered by the previously installed common form factor power supply:

throttling, by the system management module, one or more of the ITEs that receive power from the plurality of active common form factor power supplies in dependence upon the maximum amount of power that can be delivered by each of the active common form factor power supplies and in dependence upon the configuration of the each of the active and failover common form factor power supplies including reducing a total amount of power allocated for use by the one or more of the ITEs that receive power from the plurality of active common form factor power supplies to an amount that is less than or equal to a sum of the maximum amount of power that can be delivered by each of the active common form factor power supplies.

7. The apparatus of claim 6 wherein determining the maximum amount of power that can be delivered by each of the common form factor power supplies further comprises inspecting, by the system management module, vital product data ('VPD') for each of the common form factor power supplies.

8. The apparatus of claim 6 wherein throttling one or more of the ITEs in dependence upon the maximum amount of power that can be delivered by each of the common form factor power supplies further comprises throttling, by the system management module, one or more computer processors in one or more of the ITEs.

9. The apparatus of claim 6 wherein throttling one or more of the ITEs in dependence upon the maximum amount of power that can be delivered by each of the common form factor power supplies further comprises reducing, by the system management module, an amount of voltage delivered to one or more computing components in one or more of the ITEs.

10. The apparatus of claim 6 wherein throttling one or more of the ITEs in dependence upon the maximum amount of power that can be delivered by each of the common form factor power supplies further comprises instructing, by the system management module, one or more of the ITEs to enter a predetermined reduced power mode.

11. A computer program product for managing power consumption in a computing system, the computing system including a plurality of integrated technology elements ('ITEs') that receive power from a plurality of common form factor power supplies, the computer program product disposed upon a computer readable storage medium, wherein the computer readable storage medium is not a signal, the computer program product comprising computer program instructions that, when executed, cause a computer to carry out the steps of:

detecting, by a system management module, that a previously installed common form factor power supply has been replaced by a new common factor form factor power supply installed in the computing system; and responsive to detecting, by a system management module, that a new common form factor power supply has been installed in the computing system:

determining, by the system management module, a maximum amount of power that can be delivered by each of the common form factor power supplies;

determining, by the system management module, that a maximum amount of power that can be delivered by the new common form factor power supply is less than a maximum amount of power that was delivered by the previously installed common form factor power supply; and responsive to determining that the maximum amount of power that can be delivered by the new common form factor power supply is less than the maximum amount of power that was delivered by the previously installed common form factor power supply:

throttling, by the system management module, one or more of the ITEs that receive power from the plurality of active common form factor power supplies in dependence upon the maximum amount of power that can be delivered by each of the active common form factor power supplies and in dependence upon the configuration of the each of the active and failover common form factor power supplies including reducing a total amount of power allocated for use by the one or more of the ITEs that receive power from the plurality of active common form factor power supplies to an amount that is less than or equal to a sum of the maximum amount of power that can be delivered by each of the active common form factor power supplies.

12. The computer program product of claim 11 wherein determining the maximum amount of power that can be delivered by each of the common form factor power supplies further comprises inspecting, by the system management module, vital product data ('VPD') for each of the common form factor power supplies.

13. The computer program product of claim 11 wherein throttling one or more of the ITEs in dependence upon the maximum amount of power that can be delivered by each of the common form factor power supplies further comprises throttling, by the system management module, one or more computer processors in one or more of the ITEs.

14. The computer program product of claim 11 wherein throttling one or more of the ITEs in dependence upon the maximum amount of power that can be delivered by each of the common form factor power supplies further comprises reducing, by the system management module, an amount of voltage delivered to one or more computing components in one or more of the ITEs.

15. The computer program product of claim 11 wherein throttling one or more of the ITEs in dependence upon the maximum amount of power that can be delivered by each of the common form factor power supplies further comprises instructing, by the system management module, one or more of the ITEs to enter a predetermined reduced power mode.

* * * * *